United States Patent
Coffy et al.

(10) Patent No.: US 6,846,859 B2
(45) Date of Patent: Jan. 25, 2005

(54) POLYOLEFIN COMPOSITION HAVING REDUCED COLOR BODIES

(75) Inventors: Tim J. Coffy, Houston, TX (US); Steven D. Gray, League City, TX (US); Gerhard K. Guenther, Seabrook, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/160,462

(22) Filed: May 31, 2002

(65) Prior Publication Data

US 2003/0225194 A1 Dec. 4, 2003

(51) Int. Cl.[7] .............................................. C08L 5/52
(52) U.S. Cl. ...................... 524/128; 524/151; 524/121; 524/349; 524/147; 524/585
(58) Field of Search ................. 524/115, 128, 524/121, 349, 351

(56) References Cited

U.S. PATENT DOCUMENTS

| | | | | | |
|---|---|---|---|---|---|
| 4,341,880 A | * | 7/1982 | Toyoda et al. | ............... | 524/101 |
| 4,824,885 A | * | 4/1989 | Magni et al. | ................ | 524/120 |
| 4,888,369 A | * | 12/1989 | Moore, Jr. | ................... | 524/100 |
| 4,957,956 A | * | 9/1990 | Neri et al. | ................... | 524/120 |
| 5,106,892 A | * | 4/1992 | Chiolle et al. | ............... | 524/120 |
| 5,225,526 A | * | 7/1993 | Fukawa et al. | .............. | 524/119 |
| 5,300,257 A | * | 4/1994 | Akashi et al. | .......... | 252/400.24 |
| 5,455,289 A | * | 10/1995 | Caselli | ........................ | 523/223 |
| 5,614,571 A | * | 3/1997 | Mahood | ................. | 252/400.24 |
| 6,465,548 B1 | * | 10/2002 | Inoue et al. | ................. | 524/110 |
| 6,479,572 B1 | * | 11/2002 | Weber et al. | ................ | 524/126 |
| 6,593,485 B1 | * | 7/2003 | Stoll et al. | ..................... | 558/71 |
| 6,596,198 B1 | * | 7/2003 | Semen | ................... | 252/400.24 |
| 6,613,823 B1 | * | 9/2003 | Battiste et al. | ............... | 524/127 |
| 2001/0023270 A1 | * | 9/2001 | Stein et al. | .................. | 524/128 |
| 2002/0040081 A1 | * | 4/2002 | Stein et al. | .................. | 524/121 |
| 2002/0161080 A1 | * | 10/2002 | Hoffmann et al. | ........... | 524/127 |
| 2003/0158306 A1 | * | 8/2003 | Battiste et al. | ............... | 524/128 |

* cited by examiner

Primary Examiner—David W. Wu
Assistant Examiner—Rip A. Lee
(74) Attorney, Agent, or Firm—Madan, Mossman & Sriram, P.C.

(57) ABSTRACT

The present invention includes a polyolefin composition having reduced coloration with aging. The polyolefin composition comprises at least one polyolefin, an effective amount of a primary phenolic antioxidant to promote long term thermal stability of the polymer composition, and an effective amount of a phosphite processing stabilizer to promote thermal stability of the polymer composition during melt processing. The polymer composition further comprises an effective amount of a sacrificial phosphite antioxidant to reduce the yellowness index of the polymer composition. The sacrificial phosphite antioxidant and the phosphite processing stabilizer are not the same compound.

27 Claims, 1 Drawing Sheet

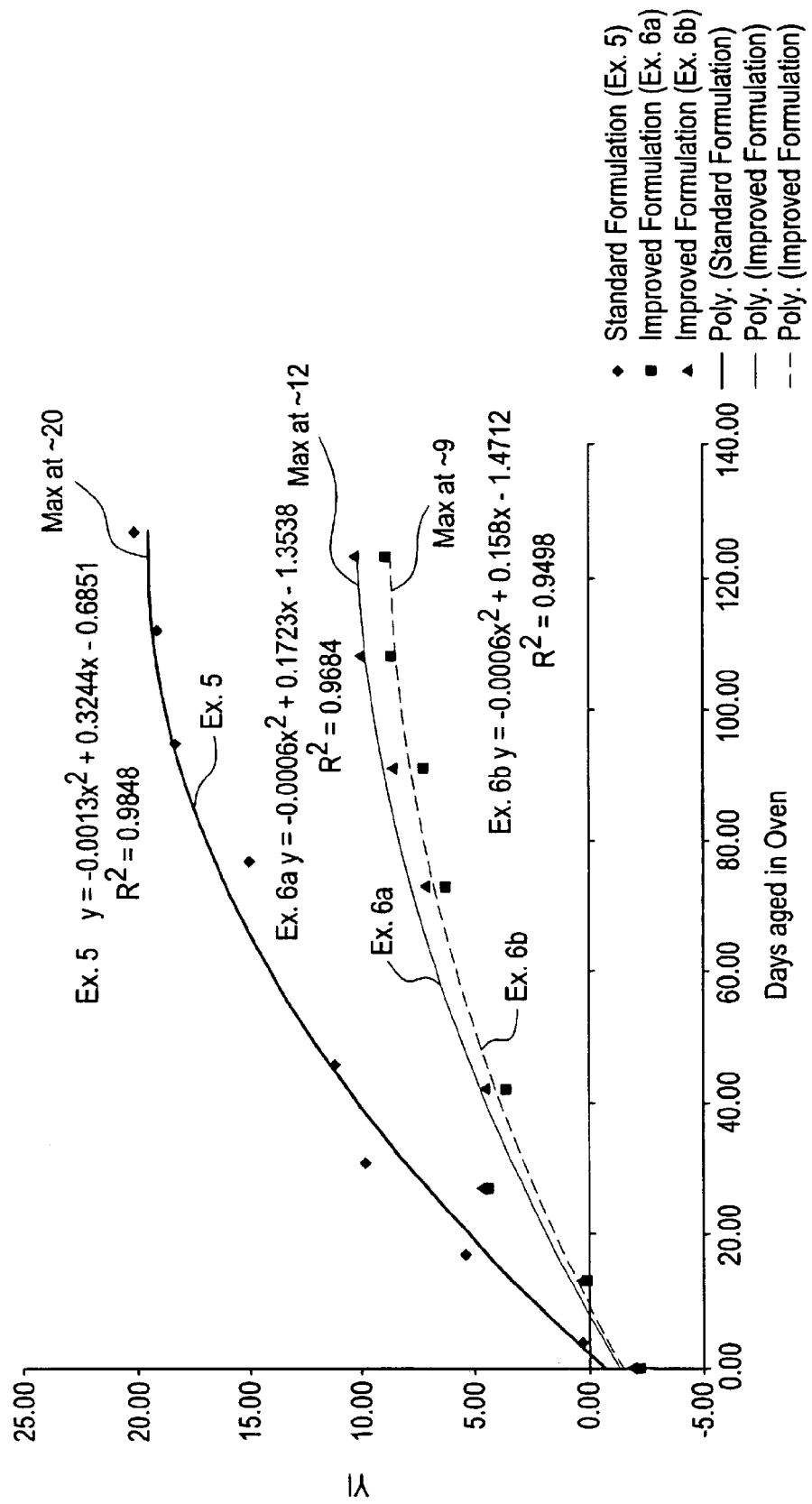

POLYOLEFIN COMPOSITION HAVING REDUCED COLOR BODIES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to polymer compositions comprising polyolefins, and in particular polyethylene. More specifically, the invention relates to a polymer composition having an effective amount of an additive package to reduce color bodies in the polymer composition.

BACKGROUND OF THE INVENTION

One method commonly employed to produce high density polyethylene (HDPE) creates an active site for polymerization by reacting an active catalyst with an ethylene monomer. Active catalysts for ethylene polymerization are known in the art as but not limited to Zeigler-Natta, metallocene, and chromium based catalysts. In particular, chromium based catalytic systems are typically chromium oxide on a high surface area silica, titania, and/or alumina support. To form the active catalyst from the chromium procatalyst, ethylene (or an alphaolefin) reduces the valence state of the chromium in the reaction medium. After the reduction process, presumably a Cr—C bond forms the active site for polymerization. Once the active site forms, the reaction mechanism is considered a transition metal catalyzed coordination polymerization.

The polymerization can take place in solution, slurry or gas phase. Preferably, the reaction takes place in a loop reactor where ethylene and an α-olefin comonomer (if used) circulate in the liquid phase. The catalyst and an inert solvent are introduced into the loop reactor, which is maintained at a temperature below the melting point of HDPE (about 135° C.) to ensure the polymer is formed in the solid state. The inert solvent and a cooling jacket are used to dissipate heat created by the highly exothermic reaction. The active sites on the catalyst are equally accessible to the ethylene throughout the catalyst particle. As such, the polymer chain grows not only outwards but also inwards, causing the granule to expand progressively. The resulting slurry of HDPE and catalyst particles circulates through the loop at a relatively high velocity to prevent the slurry from depositing on the walls of the reactor. The ethylene, α-olefin comonomer (if used), catalyst, and inert solvent are continuously charged into the reactor at a total pressure of, e.g., 450 psig. The slurry containing the polymer is continuously removed from the reactor. The solvent is recovered by hot flashing, and the polymer is dried before it is subjected to further processing, e.g., extrusion into pellets. The molecular weight of the HDPE can be controlled by the temperature of the chromium catalyst preparation, the temperature of the reactor, and by the addition of hydrogen into the reactor.

Another type of process used to create HDPE is gas-phase polymerization. In this process, an α-olefin is reacted with an active catalyst, typically a chromium based catalyst supported by silica, to form HDPE. Likewise, the molecular weight of the HDPE can be controlled by the temperature of the chromium catalyst preparation, the temperature of the reactor and by the addition of hydrogen into the reactor.

Polyolefins undergo oxidation when exposed to elevated temperatures in the presence of ambient oxygen. Polyolefins are exposed to high temperatures during melt processing operations, such as extrusion and injection molding. They can further be exposed to high temperatures during the course of their use. For example, a plastic bag made of polyethylene could be placed in a vehicle that is parked in the sun on a hot day. Thermal oxidation adversely affects the physical properties of the polyolefins. Phenolic antioxidants are commonly added to polyolefins to extend their long-term thermal stability. They are also effective in stabilizing polyolefins at the high temperatures encountered in melt processing operations.

Adding phenolic antioxidants to polyethylene produced using a chromium-based catalyst undesirably causes color bodies to form in the polyethylene. While not affecting the performance of the polyethylene, the presence of the color bodies gives the polyethylene an unappealing yellow appearance. While not wanting to be bound by theory, it is believed that upon exposure to high temperatures, unconsumed catalyst remaining in the polyethylene product oxidizes the phenolic compounds to form "quinones or similar structures" that are yellow in color. The concentration of the color bodies (believed to be quinines or similar structures) likely increases over time, and the process is accelerated as the polyethylene is repeatedly subjected to high temperature conditions. Consequently, the appearance of the polyethylene becomes more yellow as the polyethylene ages. Therefore, a need exists to inhibit the formation of color bodies in polyolefins that are produced using a chromium-based catalyst. The polymer composition of the present invention, which is resistant to color body formation, is less likely to turn yellow over time.

SUMMARY OF THE INVENTION

The present invention includes a polyolefin composition having reduced color bodies. The polyolefin composition comprises at least one polyolefin, a primary phenolic antioxidant, a phosphite processing stabilizer, and a sacrificial phosphite antioxidant. By introducing a sacrificial phosphite antioxidant to the polymer composition, the amount of color bodies that subsequently form in the polyolefin composition is reduced or eliminated. As such, the phenolic antioxidant can be added to the polyolefin composition to promote thermal stability without being concerned that discoloration of the polyolefin composition might later occur.

In an embodiment of the invention, a polymer composition comprises at least one polyolefin, an effective amount of a primary phenolic antioxidant to promote long term thermal stability of the polymer composition, and an effective amount of a phosphite processing stabilizer to promote thermal stability of the polymer composition during melt processing. The polymer composition further comprises an effective amount of a sacrificial phosphite antioxidant to reduce color bodies in the polymer composition. The sacrificial phosphite antioxidant and the phosphite processing stabilizer are not the same compound. Preferably, the polyolefin is polyethylene, the sacrificial phosphite antioxidant is bis(2,4-di-t-butylphenyl) pentaerythritol diphosphite, the phenolic antioxidant is pentaerythritol tetrakis(3-(3,5-ditert-butyl-4-hydroxyphenyl)propionate), and the phosphite processing stabilizer is tris(2,4-ditert-butylphenyl) phosphite.

According to another embodiment of the invention, an additive package for reducing color bodies in a polyolefin polymer composition is provided. The additive package includes an effective amount of a primary phenolic antioxidant to promote long term thermal stability of the polyolefin and an effective amount of a phosphite processing stabilizer to promote thermal stability of the polyolefin during melt processing. The additive package further includes an effective amount of a sacrificial phosphite antioxidant, other than the phosphite processing stabilizer, to reduce color bodies in the polymer composition. When placed in an oven at about 175° F., the polymer composition displays a coloration profile over time of less than or equal to about 0 yellowness index (YI) at 0 days, less than or equal to about 4 YI at 25 days, less than or equal to about 5 YI at 50 days, less than or equal to about 7 YI at 75 days, less than or equal to about 9 YI at 100 days, and less than or equal to about 10 YI at 125 days.

In yet another embodiment of the invention, a process for reducing color bodies in a polyolefin polymer composition comprises adding an effective amount of a primary phenolic antioxidant to the polymer composition to promote long term thermal stability thereof and adding an effective amount of a phosphite processing stabilizer to the polymer composition to promote thermal stability thereof during melt processing. The process further comprises adding an effective amount of a sacrificial phosphite antioxidant to the polymer composition to reduce color bodies therein, wherein the sacrificial phosphite antioxidant and the phosphite processing stabilizer are not the same compound.

DESCRIPTION OF THE DRAWINGS

The invention, together with further advantages thereof, may best be understood by reference to the following description taken in conjunction with the accompanying drawing in which:

FIG. 1 is a graph depicting the coloration profile of various polyethylene formulations over time as they are aged in an oven.

DETAILED DESCRIPTION OF THE PREFERRED EMBODIMENTS

In a preferred embodiment of the invention, a polymer composition comprises at least one polyolefin, e.g., polyethylene, a primary phenolic antioxidant, a phosphite processing stabilizer, and a sacrificial phosphite antioxidant. The amount of primary phenolic antioxidant in the polymer composition is effective to promote long term thermal stability of the composition, and the amount of phosphite processing stabilizer in the polymer composition is effective to promote thermal stability of the composition during melt processing. Further, the amount of sacrificial phosphite antioxidant in the polymer composition is effective to reduce color bodies in the polymer composition. The sacrificial phosphite antioxidant and the phosphite processing stabilizer serve different purposes in the polymer composition and thus are not the same compound.

The polymer composition is formed by first producing one or more polyolefins using chromium-based catalysts having silica, titania, and/or alumina-containing supports. Examples of appropriate chromium-based catalysts are disclosed in U.S. Pat. Nos. 2,825,721, 3,087,917, and 3,622,521, which are fully incorporated by reference herein. Polymerization of olefins using chromium-based catalysts is known in the art. U.S. Pat. Nos. 6,294,500, 6,265,500, 6,245,869, 6,245,867, 6,063,878, and 6,015,866 provide detailed descriptions of the formation of various polyolefin products using chromium-based catalysts and are fully incorporated by reference herein. For example, U.S. Pat. No. 6,245,867 discloses producing a blend of first and second polyethylene fractions in a two step polymerization process. The two step process comprises producing a first polyethylene fraction in a first reactor by homopolymerizing ethylene in the presence of a first activated chromium catalyst, followed by transferring the first polyethylene fraction and at least a portion of the first catalyst to a second reactor. In the second reactor, a second polyethylene fraction is produced by homopolymerizing ethylene or copolymerizing ethylene and an alpha-olefinic comonomer in the presence of a second catalyst. The second reactor is operated at a relatively low temperature to suppress residual activity of the first catalyst.

After forming a polymer composition containing at least one polyolefin, a primary phenolic antioxidant is added to the polymer composition to promote long term thermal stability of the polymer composition. Any suitable phenolic antioxidant effective for promoting long term thermal stability of the polymer composition may be used. Examples of compounds that may serve as the primary phenolic antioxidant can be found in U.S. Pat. No. 4,504,615, which is fully incorporated by reference herein. A preferred primary phenolic antioxidant is pentaerythritol tetrakis(3-(3,5-di-tert-butyl-4-hydroxyphenyl) proprionate, which is commercially available from Ciba Specialty Chemicals under the trade name Irganox® 1010. Inganox® 1010 is also referred to generically as 3,5-bis(1,1dimethylethyl)-4-hydroxy benzenepropanoic acid, 2,2-bis[[3-[3,5-bis(1,1-dimethylethyl)-4-hydroxyphenyl]-1-oxypropoxy]methyl]1,3-propanediyl ester. Examples of other suitable primary phenolic antioxidants include but are not limited to: hexamethylene bis(3,5-di-tert-butyl-4-hydroxyhydro-cinnamate (Irganox® 259); Triethyleneglycol bix [3-(3'-tert-butyl-4'-hydroxy -5'-methylphenyl)propionate (Irganox® 245); 2,2'-ethylidenebix(2,4-di-tert -butylphenol(Irganox ® 129); 3,5-di-tert-butyl-4-hydroxyhydrocinnamic acid (Irganox® 1135); 4,4',4"-[(2,4,6-trimethyl-1,3,5-benzenetriyl)tris (methylene)][2,6-bis(1,1-dimethylethyl) phenol (Irganox® 1330); Octadecyl 3,5-di-tert-butyl-4-hydroxylhydrocinnamate (Irganox® 1076); butylhydroxytoluene (BHT); and the like.

In addition to the primary phenolic antioxidant, a phosphite processing stabilizer (also called a secondary antioxidant) is added to the polymer composition to promote the thermal stability of the polymer composition during melt processing. The phosphite processing stabilizer reacts with hydroperoxides formed by the oxidation of the polymer, preventing process induced degradation of the polymer and extending the performance of the primary antioxidant. The phosphite processing stabilizer may be any suitable organophosphite effective for promoting thermal stability of the polymer composition during melt processing, and preferably is stable (i.e., unreactive) to water. A preferred phosphite processing stabilizer is tris(2,4-ditert-butylphenyl) phosphite, which is commercially available from Ciba Specialty Chemicals under the trade name Irgafos® 168. Examples of other suitable phosphite processing stabilizers include but are not limited to any aromatic phosphite that has sufficient steric bulk about the P—O bond such as Tris(2,4-di-tert-butylphenyl)phosphite (Irgafos® 168); 2,4,6 tri-tert-butylphenyl 2 butyl-2-ethyl-1,3-propane-di-olphosphite (Ultranox® 641); bis(2,4-dicumylphenyl) pentaerythritol diphosphite; and the like.

A sacrificial phosphite antioxidant is also added to the polymer composition to reduce color bodies in the polymer composition. The sacrificial phosphite antioxidant may be any suitable organophosphite effective for reducing color bodies in the polymer composition, and is preferably reactive with water. Preferably, the sacrificial phosphite antioxidant is bis(2,4-di-t-butylphenyl) pentaerythritol diphosphite, which is commercially available from the General Electric Company under the trade names Ultranox® 626 and Ultranox® 627A. Examples of other suitable sacrificial phosphite antioxidants include but are not limited aliphatic phosphites or aromatic phosphites without sufficient steric bulk about the P—O bond to protect from hydrolysis such as $(RO)_3P$ where R=methyl, ethyl, propyl, butyl, pentyl, or any aliphatic group having C=1-20; triphenylphosphite, bis-(2,4-di-tert-butylphenyl)-pentaerythritol-diphosphite (Ultranox® 626); diphenylisodecylphosphite; diphenylisooctyophosphite; tris-alkyl-phenylphosphites; and the like.

While not wanting to be bound by theory, it is theorized that the sacrificial phosphite antioxidant deactivates the metal species in the chromium-based catalyst that could otherwise accelerate the decomposition of the primary phenolic antioxidant to form quinones. The weight % ratio of the sacrificial phosphite antioxidant in the polymer composition relative to the phenolic antioxidant in the polymer composition is such that the phenolic antioxidant is protected from decomposing. In an alternative theory, it is believed that the sacrificial phosphite antioxidant disrupts the conjugated double bonds of the quinones such that they no longer appear yellow. Regardless of mechanism, the presence of the sacrificial phosphite antioxidant in accordance with the present invention inhibits the formation of color bodies in the polymer composition that undesirably give the composition a yellow appearance.

The primary phenolic antioxidant, phosphite processing stabilizer, and sacrificial phosphite antioxidant (collectively referred to as an additive package) may be added individually or in various combinations to the polymer composition. The additive package is typically added during compounding of reactor-grade polymer fluff into pellets, and the pellets comprising the additive package are sent to molding companies for use in products such as blown film, cast film, blow molded articles such as bottles, drums, etc, pipe, or any other suitable unpigmented fabricated articles. Various other components deemed appropriate to one skilled in the art may be added to the polymer composition. For example, carbowax (i.e., polyethylene glycol), which is commercially available from Ciba Specialty Chemicals under the trade name Carbowax PEG 300, may be added to the polymer composition to inhibit the initial coloration of the composition. Likewise, additives such as those disclosed in U.S. Pat. No. 4,504,615 (incorporated previously) may be added to lower the initial color (i.e., the Y intercept of the curves shown on FIG. 1) of the polymer composition.

The resulting polymer composition comprises from about 50 ppm by mass to about 3000 ppm by mass, more preferably from about 100 ppm by mass to about 2000 ppm by mass, and most preferably from about 150 ppm by mass to about 1000 ppm by mass of the primary phenolic antioxidant. The polymer composition further comprises from about 50 ppm by mass to about 2500 ppm by mass, more preferably from about 100 ppm by mass to about 2000 ppm by mass, and most preferably from about 200 ppm by mass to about 1500 ppm by mass of the phosphite processing stabilizer. The polymer composition also comprises from about 50 ppm by mass to about 1500 ppm by mass, more preferably from about 50 ppm by mass to about 1200 ppm by mass, and most preferably from about 100 ppm by mass to about 700 ppm by mass of the sacrificial phosphite antioxidant. The formation of color bodies in the polymer composition is reduced in accordance with the present invention as measured by the yellowness index of the polymer composition, in particular as the polymer composition is aged over time. Preferably, the yellowness index is reduced by greater than or equal to about 10%, more preferably by greater than or equal to about 25%, even more preferably by greater than or equal to about 40%, even more by greater than or equal to about 50%, and most preferably by greater than or equal to about 75%.

EXAMPLES

Examples 1–4 were prepared with a chromium catalyzed polyethylene powder of nominal 4.9 dg/min high load melt index (22.4 Kg) and a nominal density of 0.9529 g/cc. As shown in the Table below the Examples contained a phenolic antioxidant (Irganox® 1010), a phopshite processing stabilizer (Irgafos® 168), a sacrificial phosphite antioxidant (Ultranox® 626), or a combination of each. The particular additive package was premixed with the polyethylene powder prior to extrusion. The extrusion of the samples was carried out using a Brabender extrusion system with a model D6/2 continuous twin-screw mixer attachment (42 mm counter-rotating intermeshing screws) and a single strand die. The strand was run into a 6 foot water bath before pelletization. Extruder speed used was 40 RPM, and the temperature set points were constant for all zones at 230 C. A Hunter Associates Lab D25 optical sensor and DP 9000 processor were employed to measure the yellowness index (YI) of these samples before and after subjecting them to extrusion per ASTM D5290. Testing the different samples with the D25 optical sensor yielded the following results summarized in Table 1:

| Example | Concentration of Irganox ® 1010 (ppm) | Concentration of Irgafos ® 168 (ppm) | Concentration of Ultranox ® 626 (ppm) | YI (initially) | YI (after extrusion) |
|---|---|---|---|---|---|
| 1 | | 1600 | | 2.75 | 11.8 |
| 2 | 400 | 1600 | | 3.3 | 10.8 |
| 3 | 400 | 1600 | 300 | 0.5 | 6.4 |
| 4 | 400 | | 300 | 4.5 | 10.63 |

Example 3, which contained a sacrificial phosphite antioxidant in addition to a phosphite processing stabilizer and a phenolic antioxidant, exhibited the lowest YI both initially and after extrusion.

In Example 5, a production scale sample was produced containing 1600 ppm Irgafos® 168 and 400 ppm Irganox® 1010. In Examples 6a and 6b, production scale samples were produced containing 1600 ppm Irgafos® 168, 400 ppm Irganox® 1010 and 100 ppm Ultranox® 626. The samples corresponding to Example 5, 6a, and 6b were then placed in an oven maintained at a temperature of about 175° F. for a period of 125 days. The YI values of the samples were measured at different time intervals using the Hunter Associates Lab D25 optical sensor. FIG. 1 is a graph of the YI values of Examples 5, 6a, and 6b versus the number of days the samples were aged in an oven. Curve fit equations are provided in FIG. 1 for each of curve corresponding to Examples 5, 6a, and 6b. Example 5 displays a coloration profile over time of less than or about 0 yellowness index (YI) at 0 days, about 9 YI at 25 days, about 11 YI at 50 days, about 15 YI at 75 days, about 19 YI at 100 days, and about 20 YI at 125 days and beyond. Examples 6a and 6b according to the present invention display a coloration profile less than that of the standard formulation. More specifically, Examples 6a and 6b according to the present invention displayed a coloration profile over time of less than or equal to about 0 YI at 0 days, less than or equal to about 4 YI at 25 days, less than or equal to about 5 YI at 50 days, less than or equal to about 7 YI at 75 days, less than or equal to about 9 YI at 100 days, and less than or equal to about 12 YI at 125 days and beyond. In terms of percentage reductions, Examples 6a and 6b show an initial reduction at 0 days, a reduction of about 55% at 25 days, a reduction of about 55% at 50 days, a reduction of about 53% at 75 days, a reduction of about 53% at 100 days, and a reduction of about 40% at 125 days (i.e., at maximum). In sum, FIG. 1 illustrates that the improved formulation Examples 6a and 6b exhibited significantly lower YI values than the standard formulation of Example 5 at initial values, as the samples were aged in an oven, and at maximum values.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. A polymer composition, consisting essentially of:
   (a) at least one polyolefin;
   (b) an effective amount of a primary phenolic antioxidant to promote long term thermal stability of the polymer composition, wherein the phenolic antioxidant is pentaerythritol tetrakis(3-(3,5-di-tert-butyl-4-hydroxyphenyl)propionate);
   (c) an effective amount of a phospite processing stabilizer to promote thermal stability of the polymer composition during melt processing; and
   (d) an effective amount of a sacrificial diphosphite antioxidant to reduce the yellowness index of the polymer composition, wherein the sacrificial diphosphite antioxidant and the phosphite processing stabilizer are not the same compound.

2. The polymer composition of claim 1 wherein the at least one polyolefin is polyethylene.

3. The polymer composition of claim 2 wherein the sacrificial diphosphite antioxidant is an aliphatic diphosphite or an aromatic phosphite.

4. The polymer composition of claim 2 wherein the sacrificial diphosphhite antioxidant is a compound of the formula $(RO_2)_2(P_2O_4)$, where R=methyl, ethyl, propyl, butyl, pentyl, or any aliphatic group having 1 to 20 carbon atoms.

5. The polymer composition of claim 2 wherein the sacrificial diphosphite antioxidant is bis(2,4-di-t-butylphenyl)pentaerythritol diphosphite.

6. The polymer composition of claim 5 wherein the sacrificial diphosphite antioxidant comprises from about 50 ppm by mass to about 1500 ppm by mass of the total polymer composition.

7. The polymer composition of claim 5 wherein the sacrificial diphosphite antioxidant comprises from about 50 ppm by mass to about 1200 ppm by mass of the total polymer composition.

8. The polymer composition of claim 5 wherein the sacrificial diphosphite antioxidant comprises from about 100 ppm by mass to about 700 ppm by mass of the total polymer composition.

9. The polymer composition of claim 6 wherein the phenolic antioxidant comprises from about 50 to about 3000 ppm by mass of the total polymer composition.

10. The polymer composition of claim 7 wherein the phenolic antioxidant comprises from about 100 to about 2000 ppm by mass of the total polymer composition.

11. The polymer composition of claim 8 wherein the phenolic antioxidant comprises from about 150 to about 1000 ppm by mass of the total polymer composition.

12. The polymer composition of claim 1 wherein the phosphite processing stabilizer is tris(2,4-ditert-butylphenyl)phosphite.

13. The polymer composition of claim 9, wherein the phosphite processing stabilizer is tris(2,4ditert-butylphenyl)phosphite and comprises from about 50 to about 2500 ppm by mass of the total polymer composition.

14. The polymer composition of claim 10 wherein the phosphite processing stabilizer is tris(2,4-ditert-butylphenyl)phosphite and composes from about 100 to about 2000 ppm by mass of the total polymer composition.

15. The polymer composition of claim 11 wherein the phosphite processing stabilizer is tris(2,4-ditert-butylphenyl)phosphite and comprises from about 200 to about 1500 ppm by mass of the total polymer composition.

16. The polymer composition of claim 1 wherein the yellowness index of the polymer composition is reduced by greater than or equal to 10%.

17. The polymer composition of claim 1 wherein the yellowness index of the polymer composition is reduced by greater than or equal to 25%.

18. The polymer composition of claim 1 wherein the yellowness index of the polymer composition is reduced by greater than or equal to 40%.

19. The polymer composition of claim 1 wherein the yellowness index of the polymer composition is reduced by greater than or equal to 50%.

20. The polymer composition of claim 1 wherein the yellowness index of the polymer composition is reduced by greater than or equal to 75%.

21. The polymer composition of claim 1, when placed in an oven at 175° F., displays a coloration profile over time of equal to 0 yellowness index (YI) at 0 days, less than 9 YI at 25 days, less than 11 YI at 50 days, less than 15 YI at 75 days, less than 19 YI at 100 days, and less than 20 YI at 125 days.

22. The polymer composition of claim 1, when placed in an oven at 175° F., displays a coloration profile over time of equal to 0 yellowness index (YI) at 0 days, less than or equal to about 4 YI at 25 days, less than or equal to 5 YI at 50 days, less than or equal to 7 YI at 75 days, less than or equal to 9 YI at 100 days, and less than or equal to 12 YI at 125 days.

23. The polymer composition of claim 15, when placed in an oven at 175° F., displays a coloration profile over time of equal to 0 yellowness index (YI) at 0 days, less than or equal to 4 YI at 25 days, less than or equal to 5 YI at 50 days, less than or equal to 7 YI at 75 days, less than or equal to 9 YX at 100 days, and less than or equal to 10 YI at 125 days.

24. An article of manufacture comprising the polymer composition of claim 1.

25. An additive package for reducing color in a polyolefin polymer composition, consisting essentially of:

(a) an effective amount of a primary phenolic antioxidant to promote long term thermal stability of the polymer composition, wherein the phenolic antioxidant is pentaerythritol tetrakis(3-(3,5-di-tert-butyl-4-hydroxyphenyl)proprionate);

(b) an effective amount of a phosphite processing stabilizer to promote thermal stability of the polymer composition during melt processing; and (c) an effective amount of a sacrificial diphosphite antioxidant to reduce the yellowness index of the polymer composition, wherein the sacrificial diphosphite antioxidant and the phosphite processing stabilizer are not the same compound.

26. A process for reducing color in a polyolefin polymer composition, consisting essentially of:

(a) adding an effective amount of a primary phenolic antioxidant to the polymer composition to promote long term thermal stability thereof, wherein the phenolic antioxidant is pentaerythritol tetrakis(3-(3,5-tert-butyl-4-hydroxyphenyl)propionate);

(b) adding an effective amount of a phosphite processing stabilizer to the polymer composition to promote thermal stability thereof during melt processing; and (c) adding an effective amount of a sacrificial diphosphite antioxidant to the polymer composition to reduce the yellowness index of the polymer composition, wherein the sacrificial diphosphite antioxidant and the phosphite processing stabilizer are not the same compound.

27. A polymer composition produced by the process of claim 26.

* * * * *